Figure 1:
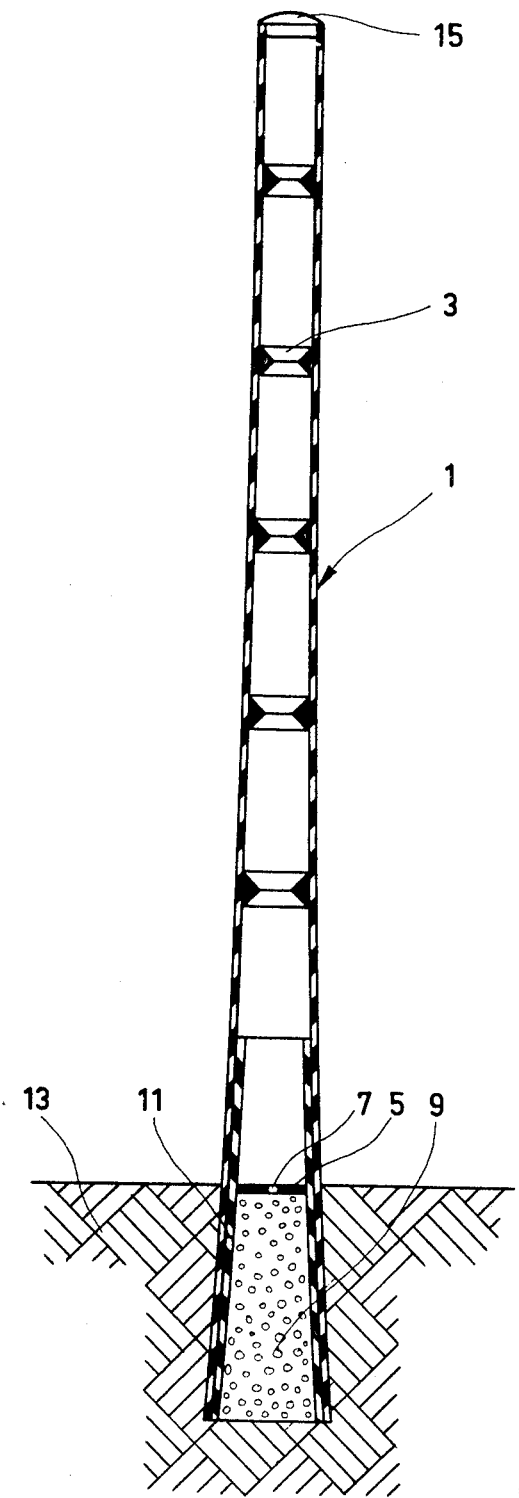

United States Patent [19]

Frehner

[11] 4,246,732
[45] Jan. 27, 1981

[54] POLE, IN PARTICULAR FOR ELECTRIC LINES

[76] Inventor: Roland Frehner, Talstrasse 17, 8620 Wetzikon, Switzerland

[21] Appl. No.: 881,787

[22] Filed: Feb. 27, 1978

[30] Foreign Application Priority Data

Feb. 27, 1977 [CH] Switzerland .................. 2376/77

[51] Int. Cl.³ .............................................. E04C 3/36
[52] U.S. Cl. .................... 52/309.1; 52/720; 52/223 R; 52/225
[58] Field of Search ................ 52/98, 99, 309.1, 720, 52/725, 727, 80, 223, 225; 43/18 GF

[56] References Cited

U.S. PATENT DOCUMENTS

| 2,870,793 | 1/1959 | Bailey | 52/727 |
|---|---|---|---|
| 2,929,409 | 3/1960 | Waehner | 48/18 GF |
| 3,003,275 | 10/1961 | Reid | 43/18 GF |
| 3,013,584 | 12/1961 | Reed | 52/727 |
| 3,461,593 | 8/1969 | Martuch | 43/18 GF |
| 3,462,907 | 8/1969 | McKean | 52/721 |
| 3,519,294 | 7/1970 | Barnes | 43/18 GF |
| 3,813,098 | 5/1974 | Fischer | 52/727 |
| 3,813,837 | 6/1974 | McClain | 52/309.1 |
| 3,922,827 | 12/1975 | Rosenblatt | 52/80 |
| 3,942,296 | 3/1976 | Meyer | 52/296 |
| 4,024,666 | 5/1977 | Carver | 43/18 GF |
| 4,133,708 | 1/1979 | Tokuno | 43/18 GF |

FOREIGN PATENT DOCUMENTS

| 2408935 | 5/1974 | Fed. Rep. of Germany | 52/727 |
|---|---|---|---|
| 70799 | 4/1952 | Netherlands | 52/80 |
| 192337 | 2/1923 | United Kingdom | 52/296 |
| 717699 | 11/1954 | United Kingdom | 52/296 |

Primary Examiner—James A. Leppink
Assistant Examiner—Henry E. Raduazo
Attorney, Agent, or Firm—Darby & Darby

[57] ABSTRACT

A pole, particularly for electric lines, formed by a hollow body of resin impregnated material which has a shape, of decreasing diameter the narrow end of the pole at its tip. Reinforcing members extend radial of the longitudinal axis of the pole along its length and filaments or bands are stretched over the reinforcing members with further filaments wound thereover along the pole axis. A method and apparatus for producing such poles in which a plurality of filaments or bands are strung between a pair of clamping means to form a core, reinforcing means are placed within the core, the clamped plurality of filaments or bands are rotated and a skein of wrapping material is wound over the core by a reciprocating machine. The tension of the winding operation is controlled to produce a dual tapered body, the body being cut in half to form two poles.

6 Claims, 4 Drawing Figures

POLE, IN PARTICULAR FOR ELECTRIC LINES

Poles for electric lines, e.g. telephone poles, have heretofore been made either of wood or of steel. Steel poles are relatively expensive, require regular care because of their susceptibility to corrosion, and their heavy weight is disadvantageous, e.g. in transport. The less expensive wood poles have a limited life of about 20 years and must be reimpregnated every 5 years. Premature destruction by rotting is usually not visible. Impregnation, which is to prevent early rotting and invasion by worms and the like, causes pollution of the environment by poisons which affects also birds, e.g. woodpeckers.

In agricultural areas wood poles are often destroyed prematurely by cattle which like to rub against the rough wood surface. Other disadvantages are the easy burning of wood poles and their electric conductivity when in a wet state. In timber poor areas, moreover, wood poles are relatively expensive due to long transport distances.

The mentioned disadvantages are avoided by a pole which is characterized according to the invention in that it consists of a hollow body of fiber-reinforced plastic. Such poles are weather-resistant, require no surface treatment, and have high strength combined with low weight. Their good insulation properties offer safe protection from destruction by lightning, and their smooth surface prevents cattle from using them as scratching posts. Further, by coloring the plastic, certain aesthetic effects can be obtained with plastic poles at little cost, so that they fit into the landscape more harmoniously.

An especially high strength of the pole, in particular to wind forces, can be achieved by the fact that the pole has the general form of a hyperboloid whose narrowest cross-section point is at the tip of the pole. For the manufacture of such a pole a method is proposed which is characterized in that by stretching a plurality of filaments or bands for the plastic reinforcement a winding core is formed, on which a resin-impregnated skein material is wound.

The filaments or bands forming the winding core may be attached in the zone of the circumference of two rotatably mounted clamping bodies or grips, whose distance from each other corresponds to twice the pole length. By the wrapping of the cylindrical winding core thus formed or respectively the stretching of the skein material to be wound, there results an increasing cross-section reduction toward the center between the two grips, so that the double pole takes on the general form of a hyperboloid. By bisecting the finished wound double pole at the narrowest cross-section point or center of the double pole one obtains two poles having the general form of a hyperboloid whose narrowest cross-section point is at the tip of the pole.

The filaments or bands and the wrapping material may consist of resin-impregnated glass fiber rovings, so that a firm bond results as the resin hardens. As resin is suitable, e.g. polyester.

An especially good strength of the pole or poles results when the pole is formed by lamination of several reinforcement layers, in that each respective layer is formed by stretching reinforcement filaments or bands between the grips, and the contiguous layer, by wrapping the previously produced layer. Further, increased strength can be attained by arranging in the winding body produced by stretching of the filaments or bands, annularly applied reinforcement bodies, e.g. rings or disks, spaced from each other in axial direction, which for the production of a hyperboloid body may accordingly have different diameters. The cross-sectional stiffening of the pole, existing in places, leads to increased buckling strength of the pole, as in bamboo rods.

The bottom part of the pole, subject to greatest stress, may be reinforced by insertion of a pole stump, whose outer form corresponds to the inner form of the hollow pole. Advantageously also the lower end of the pole may be filled with a composition, e.g. earth mixed with a soil compaction agent. A closing disk inserted in the pole can limit the height or depth of filling when the earth material is being filled in. This filling causes the center of gravity of the pole to be lowered greatly, so that it is easier to erect, has inherent frequency of vibrations, and will not be lifted up when the water table rises.

To carry out the method for the production of a pole according to the invention there is proposed further a winding machine which is characterized by two grips mounted spaced from each other coaxially and rotatably and connected with a rotary drive, the grips having means for the attachment of filaments or bands to be stretched between the two grips, and a filament or band feed system with means for its guiding and reciprocating movement on a path parallel to the axis of rotation of the grips.

Figure 2:
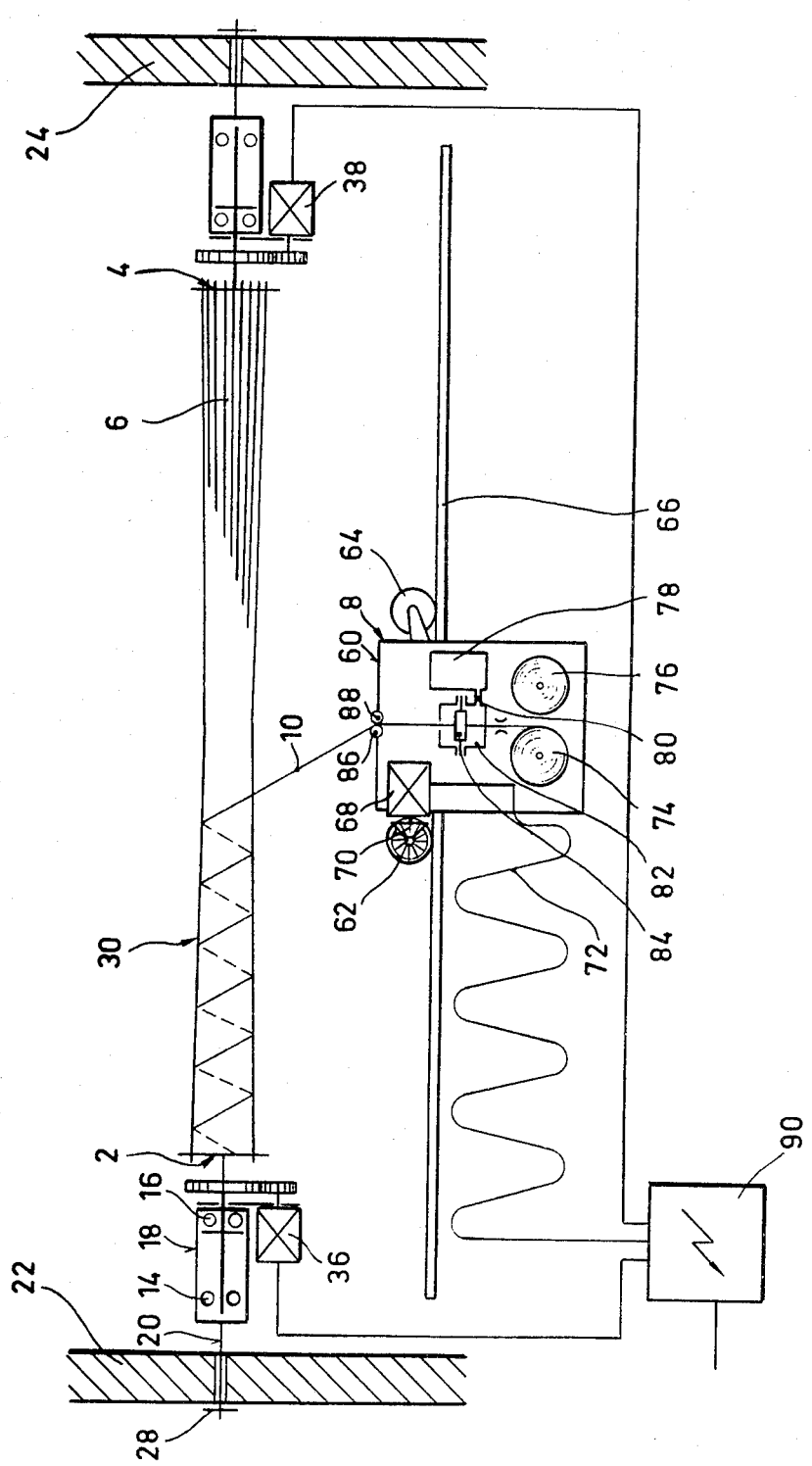
Figures 3, 4:
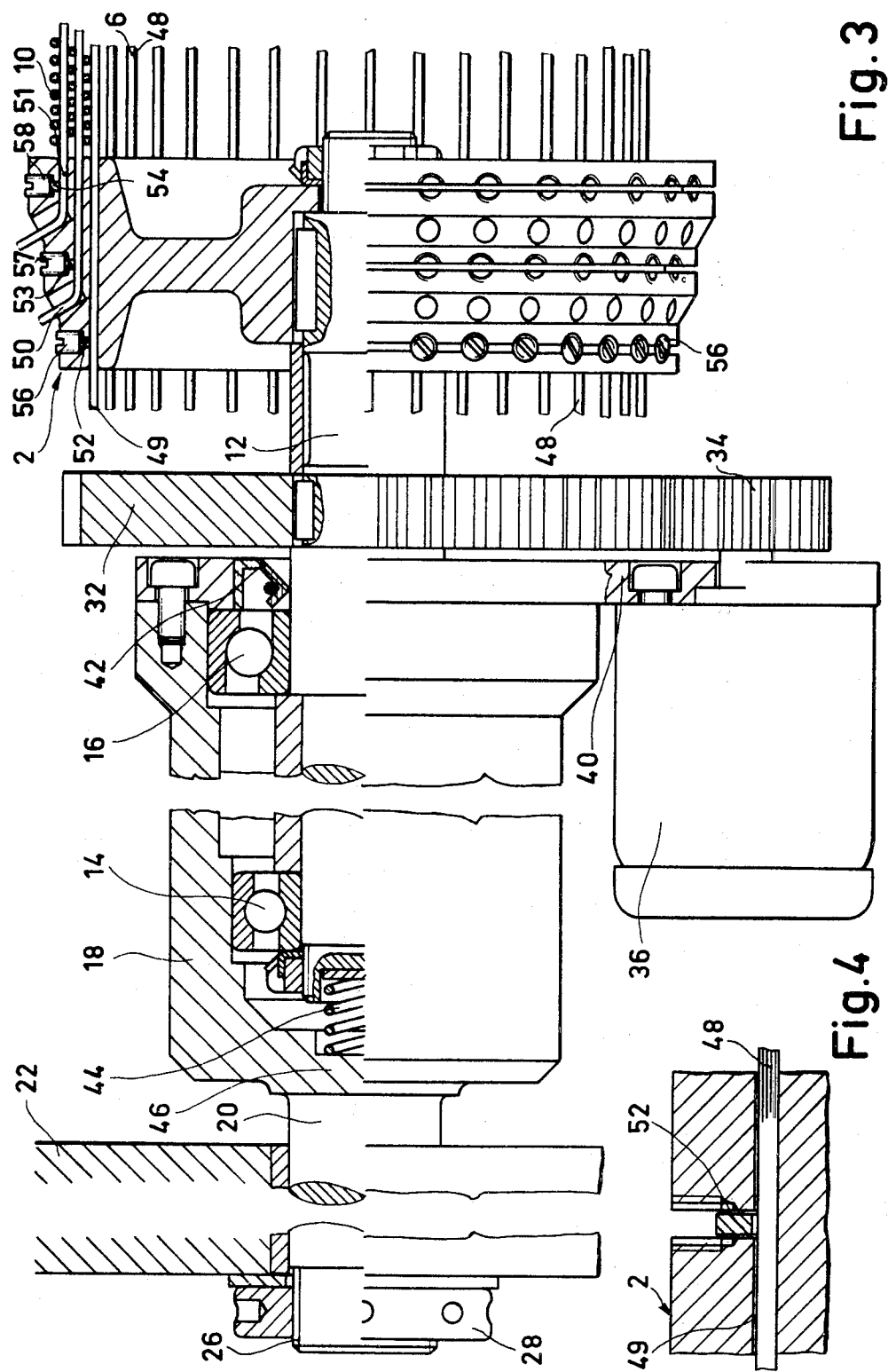

In the following, the invention will be further explained with reference to the drawings, in which:

FIG. 1 shows a longitudinal section through an embodiment of the pole according to the invention;

FIG. 2, a diagram of a winding machine for the production of a pole;

FIG. 3, a bisectioned top view of a grip of the winding machine according to FIG. 2, with its mount and its drive; and FIG. 4, an enlarged partial section of the grip with a means for the attachment of one end of a filament.

The winding machine according to FIG. 2 has two grips 2, 4 for the skein material 6 and a feed system 8 for the wrapping material 10.

Both grips 2, 4 are supported, as shown in FIG. 3, by a shaft 12, which is mounted by a radial bearing 14 and an axial bearing 16 in a cup-shaped housing 18. Housing 18 has a shank 20, extending parallel to shaft 12 or coaxial therewith, which shank is mounted axially displaceable in a frame member 22, 24. At the tend of shank 20 is a screw thread 26, so that a nut 28 meshing with the thread 26 can serve to tension the skein material. To absorb the tension, the two frame members 22, 24 are connected by a part of the machine frame, not shown. For the production of double poles 30 of different lengths the two frame members 22, 24 may be relatively adjustable by means not shown, e.g. a spindle drive. This adjusting means or spindle drive may also serve for the precise setting of the tension of the skein material, e.g. also as a function of the winding operation, to obtain a certain hyperboloid form.

On shaft 12 is secured a gear 32, in which engages the pinion 34 of an electric motor 36, 38. The motor is flanged to a housing plate 40 which closes the cup-shaped housing 18 around shaft 12. A packing ring 42 serves as seal between shaft 12 and this housing plate. A helical spring 44 arranged between the bottom wall 46 of housing 18 and the end of shaft 12 prevents the balls of the axial bearing 16 from falling out of the races when shaft 12 is displaced with grip 2 empty. The mounting and drive of grip 4 opposite grip 2 occurs in the same manner as shown in FIG. 3, except that the corresponding means are arranged reversed or in mirror symmetry thereto.

The attachment of the skein material 6 or of the numerous glass fiber rovings 48 can occur in the manner shown in FIG. 3 and 4 by clamping. The roving is passed through one of the bores 49 to 51, and a lock ring 52 to 54, inserted in a groove intersecting with the respective bore, is pressed by screws 56 to 58 onto the roving 48. First the rovings are fastened in the radially inner bores 49 until they form in circumferential direction a body, e.g. a cylindrical body, consisting of numerous parallel rovings, which serves as a first winding core. Another layer of axial-parallel rovings is stretched between the grips 2 and 4 preferably only after the first core has been wrapped with one or more layers of the resin-impregnated rovings forming the wrapping material 10, as can be seen from the view in transverse section of FIG. 3.

Instead of the attachment by means of lock rings 52 to 54 and screws 56 to 58, the attachment may be effected by hooks not shown, which are secured to a grip 2, 4. To this end, a roving is passed without interruption from one grip 2 to the other grip 4 and there over one of the hooks. Instead of hooks, groove type notches may be provided in the grips. Further, each grip may consist of several slotted rings to be fitted one over the other in that, after the smallest slotted ring has been covered, the next larger ring is slipped over the smallest ring after having been held in a space between gear 32 and the smalles ring. Lastly the attachment to the grips may be by means of clamping eccentrics, each connected with a clamping lever.

If the winding core is formed by moving a roving back and forth over fastening members at the grips 2, 4, the reciprocating guiding or feed of the roving may be effected by means of the feed system 8. For this purpose, a guide arm not shown with guide rolls may be secured on the housing 60 of the feed system.

The feed system 8 or respectively its housing 60 is guided by wheels 62, 64 on a track 66, and its reciprocating movement occurs by the drive of an electric motor 68, which is in drive connection with wheel 62 through a bevel gear 70. The current supply to the motor occurs over the sinusoidally laid cable 72. In housing 60 are arranged supply rolls 74, 76 for the roving material as well as a supply tank 78 for resin material. In a vat 82 connected with the supply tank 78 via a line 80, the roving is impregnated with resin, by passing it under a roll 84 mounted in the vat. From the vat the roving runs through a pair of guide rolls 86, 88 and thence is wound helically due to the rotation of the winding body. It is understood that several rovings may be fed simultaneously by the feed system.

To control the speed of rotation of the grips 2, 4, the reciprocating movement of the feed system 8, and the winding tension, a control unit 90 is provided, which is shown schematically in FIG. 2. Different control programs serve to produce differently shaped poles or respectively different winding patterns. With increasing winding tension in relation to the tension of the filaments of the winding core, the hyperboloid form of the produced double pole is more pronounced. The mean diameter of the double pole can be determined by selection of the diameter of the grips 2 and 4.

After bisection of the double pole 30, one resultant half has the form of the pole 1 illustrated in FIG. 1. In the example according to FIG. 1, there are incorporated in the pole, moreover, at equal axial intervals along the pole, annular reinforcement bodies 3 having an increasingly greater diameter downwardly according to the hyperboloid form.

Such annular reinforcement bodies 3 are to be preferred over full or disk-shaped reinforcement bodies, as they allow any condensation that may form to drain off. Accordingly there is provided also in the closing disk 5 an opening 7 which seals the lower cavity of the pole, filled with earth 9, toward the top. A pole stump 11 fitted into pole 1 at the bottom reinforces the lower pole portion which is under heaviest stress due to its being gripped in the ground 13. The tip of the pole where it was cut off from the double pole 30 is sealed by a cap 15.

What is claimed is:

1. An elongated substantially rigid pole for electric lines and the like comprising,
    a plurality of strands under tension lain longitudinally of the length of the pole forming an elongated hollow core,
    a plurality of reinforcing members located within said core and spaced apart along the pole and extending radially of the pole longitudinal axis to engage said strands,
    an outer skein of fiber reinforced plastic material wound over said strands and generally crosswise thereto to deflect the strands inwardly to form a generally hyperboloid shape between every two adjacent reinforcing members, and
    a material for solidifying the strands on the outer skein into a substantially rigid structure with the reinforcing members.

2. An elongated pole as in claim 1 wherein said reinforcing members are annular.

3. An elongated pole as in claim 1 wherein the dimensions of the reinforcing members transverse to the pole longitudinal axis decrease along the pole length so that the pole tapers from a wide end to a narrower end.

4. An elongated pole as in claim 3 wherein said pole has a generally overall hyperboloid shape.

5. A pole according to any one of claims 1 to 3 further comprising a hollow reinforcement body inserted in the lower portion of the pole body and extending in the axial direction of the pole, the outer surface of the hollow body bearing against the inner face of the pole.

6. A pole according to any one of claims 1 to 3 wherein the lower pole portion is filled in its entire hollow cross-section by a composition.

* * * * *